Dec. 25, 1951 H. R. SUMMERHAYES, JR., ET AL 2,580,254

AUTOMATIC FREQUENCY CONTROL SYSTEM

Filed June 8, 1945 2 SHEETS—SHEET 1

Inventors:
Harry R. Summerhayes, Jr.
Paul W. Howells,
by Harry E. Dunham
Their Attorney.

Inventors:
Harry R. Summerhayes, Jr.
Paul W. Howells,
by Harry E. Dunham
Their Attorney.

UNITED STATES PATENT OFFICE 2,580,254

AUTOMATIC FREQUENCY CONTROL SYSTEM

Harry R. Summerhayes, Jr., and Paul W. Howells, Schenectady, N. Y., assignors to General Electric Company, a corporation of New York Application June 8, 1945, Serial No. 598,360

7 Claims. (Cl. 250—36)

Our invention relates to automatic frequency control circuits, and the like.

It is a general object of our invention to provide a new and improved, highly stable and accurate, automatic frequency control system.

It is another object of our invention to provide an automatic frequency control circuit capable of maintaining a local oscillator frequency at a controllable frequency difference with respect to a fixed frequency.

It is a further object of our invention to provide an automatic frequency control circuit having a high loop gain.

It is still another object of our invention to provide, in an automatic frequency control feedback system, automatic means for ensuring that the system invariably locks in at a desired stable point, and not at a point of instability.

Another object of our invention is the provision of a new and improved frequency discriminating network particularly suited for relatively sharp frequency variation response.

Figure 1:
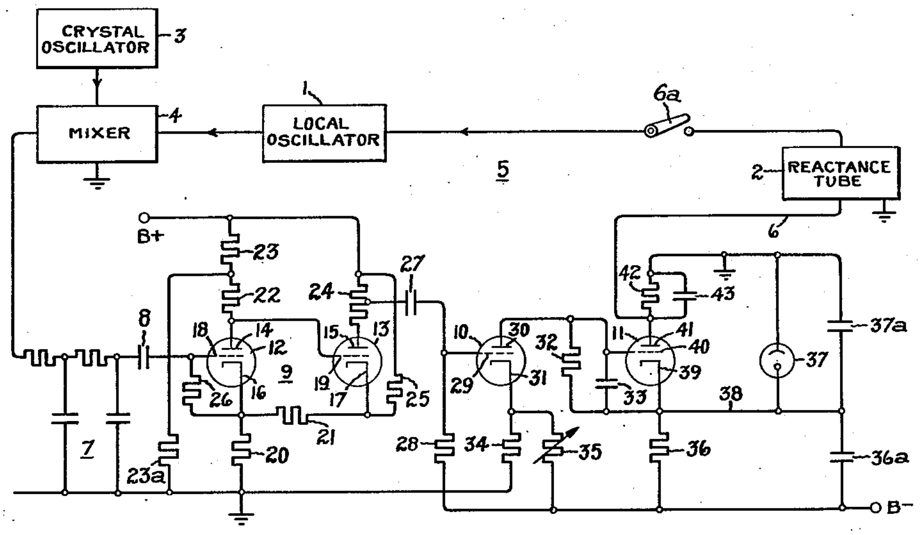
Figure 3:
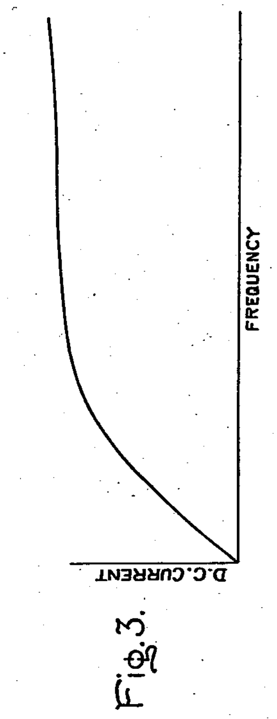

Our invention itself will be more fully understood and its various objects and advantages further appreciated by referring now to the following detailed specification taken in conjunction with the accompanying drawing, in which Fig. 1 is a schematic circuit diagram, partially in block form, of an automatic frequency control circuit embodying our invention and Figs. 2, 3, 4 and 5 are graphical representations of certain of the electrical characteristics of the circuit shown at Fig. 1.

Referring now to the drawings, and particularly to Fig. 1, we have shown an automatic frequency control system for a local oscillator 1. The system comprises a reactance tube frequency determining circuit 2 associated with the oscillator 1, a source of oscillations of fixed frequency, such as a crystal oscillator 3, a mixer or converter 4, and a frequency variation response network 5. The local oscillator 1 may suitably comprise an electron discharge device having its output circuit regeneratively coupled to its input circuit to support oscillations and including, as a frequency determining element, the reactance tube circuit 2. The reactance tube is provided with a grid bias input lead 6 connected to the output of the discriminator circuit 5. The reactance tube 2 is connected in the frequency determining circuit of the oscillator 1 through a switch 6*a*. The unidirectional potential of the lead 6 determines the effective reactance of the reactance tube and thereby determines the frequency of the local oscillator 1.

Oscillations from the local oscillator 1 and the crystal oscillator 3 are supplied to the mixer 4 and the difference frequency oscillations from the output of the mixer are supplied through a low pass filter 7 and a coupling capacitor 8 to the input of the discriminator circuit 5. The discriminator circuit comprises a rectangular pulse forming trigger network 9 having its output coupled through a differentiator to an integrating discharge device 10 which is, in turn, connected through an amplifying discharge device 11 to the reactance tube input lead 6.

The rectangular pulse forming network 9 per se is described and claimed in a copending application of Harry R. Summerhayes, Jr., Serial No. 598,361, filed June 8, 1945, now Patent 2,459,852, issued January 25, 1949, and assigned to the same assignee as the instant application. This network comprises a pair of electron discharge devices 12 and 13 having anodes 14, 15, cathodes 16, 17, and control electrodes 18, 19, respectively. The discharge devices 12 and 13 are connected in parallel circuit relation through a common cathode resistor 20 to a suitable source of positive unidirectional potential indicated on the drawings by B+. The cathodes 16 and 17 are connected together through a resistor 21 and the cathode 16 is connected to ground through the resistor 20. The anode 14 is connected through an anode resistor 22 to an intermediate point on a high resistance potential divider 23, 23*a* connected between B+ and ground, and the anode 15 is connected to B+ through an anode resistor 24. The anode 14 of the discharge device 12 is connected directly to the control electrode 19 of the discharge device 13, and the cathode 17 of the discharge device 13 is connected to B+ through a resistor 25. The resistor 25, in series with the resistors 20 and 21, constitutes a potential divider between B+ and ground. The discharge device 12 is provided with a grid bias resistor 26 connected between the cathode 16 and the control electrode 18, and the control electrode 18 is connected through the coupling condenser 8 and filter 7 to the output of the mixer 4.

The pulse output voltage appearing across a portion of the anode resistor 24 is supplied through a differentiating circuit comprising a capacitor 27 and resistor 28 to the input or control electrode 29 of the integrating discharge device 10. The discharge device 10 includes also an anode 30 and a cathode 31. The anode 30 is connected through a potential divider to a source of unidirectional potential negative with respect to ground, and the anode circuit includes an integrating circuit comprising a resistor 32 and a capacitor 33 connected in parallel circuit relation. The cathode 31 is connected through a second potential divider to the negative potential supply source and is maintained negative with respect to the anode 30. We have indicated a source of negative potential supply on the drawing at B—. The cathode potential divider is constituted by a pair of resistors 34 and 35 connected in series circuit relation between B— and ground. The common point of the resistors 34 and 35, to which the cathode 31 is connected, is maintained at a negative potential relatively close to the potential of the source B—. The anode potential divider is constituted by a resistor 36 and a voltage regulating gaseous discharge device 37 connected in series circuit relation between the potential source B— and ground. The discharge device 37 maintains the potential drop thereacross substantially constant, and the resistance of the resistor 36 is such that the wire 38 connected to the cathode of the discharge device 37 is maintained at a potential negative with respect to ground and positive with respect to the potential of the cathode 31 of the discharge device 10. Preferably, the negative potential of the wire 38 is approximately one-half the negative potential of the source B—. The anode 30 of the discharge device 10 is connected to the wire 38 through the resistor 32 and capacitor 33 in parallel. The gaseous discharge device 37 and the resistor 36 are shunted by a pair of by-pass capacitors 37*a* and 36*a*, respectively.

The voltage across the capacitor 33 is supplied to the input of a direct coupled amplifying discharge device 11. The discharge device 11 includes a cathode 39 connected to the wire 38 and a control electrode 40 connected directly to the anode 30 of the discharge device 10. The anode 41 of the direct coupled amplifier 11 is connected to ground through an integrating circuit comprising a resistor 42 and a capacitor 43 in parallel circuit relation. The negative unidirectional potential appearing across the capacitor 43 is supplied to the reactance tube 2 through the input lead 6, which is connected by the switch 6*a* between the grid of the reactance tube and the anode 41 of the direct coupled amplifier 11.

It will, of course, be understood by those skilled in the art that the discriminator circuit 5 is useful in many applications other than connection with the automatic frequency control circuit herein described, so that any suitable source of variable frequency oscillations to be discriminated may be connected to the input capacitor 8 within the purview of our invention.

The operation of our new and improved automatic frequency control circuit will now be more readily understood by referring to Figs. 2, 3, 4 and 5 in conjunction with Fig. 1.

When no signal potential is applied to the control electrode 18 through the coupling capacitor 8, the pulse forming circuit 9 is in a normal condition with either the discharge device 12 conducting and the discharge device 13 non-conducting or both discharge devices conducting, depending upon the proportioning of the resistor 25 with respect to the other circuit constants. The pulse forming circuit is fully operative if the resistor 25 is omitted and, in such case, the discharge device 13 conducts at all times. If, however, the resistor 25 is employed, it may be of such a value that the voltage drop thereacross maintains the cathode 17 of the discharge device 13 sufficiently positive with respect to the control electrode 19 that the discharge device 13 will be cut off when the discharge device 12 is conducting. Let it be assumed that this is the normal condition of the pulse forming circuit 9 when no signal is supplied to the grid 18.

If, now, a negative triggering potential is impressed upon the control electrode 18, the discharge device 12 will be cut off and the discharge device 13 substantially simultaneously rendered conductive by the imposition of a positive potential upon the control electrode 19 from the anode 14. The discharge devices 12 and 13 will remain in this condition so long as the impressed triggering potential maintains the discharge device 12 cut off. As soon as the negative triggering potential decreases sufficiently to permit the discharge device 12 to conduct, the potential of the control eletcrode 19 of the discharge device 13 decreases and the potential of the cathode 17 increases, thereby to cut off the discharge device 13. As the device 13 cuts off the cathode resistor current decreases and the potential of the cathode 16 decreases so that switching is accomplished abruptly. Thus, it will be seen that, if an oscillating triggering potential is supplied to the control electrode 18 which alternately drives control electrode 18 positive and negative with respect to ground, the voltage drop across the anode resistor 24 of the discharge device 13 will take the form of a substantially rectangular voltage pulse having a frequency equal to the frequency of the triggering potential. In the automatic frequency control circuit described herein by way of illustration, the oscillating triggering potential is the difference frequency oscillations supplied from the mixer 4. Such a variable frequency oscillation is shown at (*a*) of Fig. 2. The rectangular wave output voltage of the pulse forming circuit 9 taken from the anode resistor 24 and corresponding to the input signal of curve (*a*) is shown at (*b*) of Fig. 2. It will be seen that whenever the triggering potential (*a*) becomes negative with respect to zero, or ground, potential, the potential (*b*) applied to capacitor 27 drops suddenly from B+ to a much lower value due to current flow in device 13, and remains there until the triggering potential (*a*) increases toward zero sufficiently to permit device 12 to become conducting and again to cut off device 13.

Figure 2:
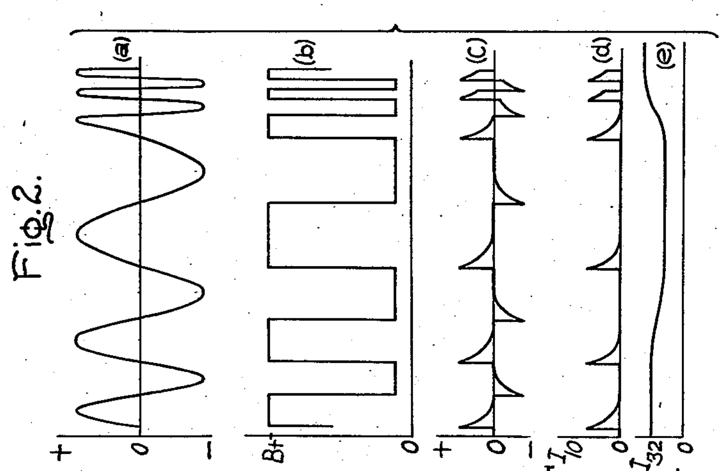

The rectangular pulses of the curve (*b*) at Fig. 2 are of a uniform intensity and are substantially independent of the intensity of the triggering oscillations shown at (*a*), over a wide range of frequency, because the intensity of the rectangular oscillations is determined almost entirely by the constants of the pulse forming circuit. These rectangular pulses are supplied to the differentiating circuit 27, 28 and provide across the resistor 28 alternate series of positive and negative differentiated pulses of uniform intensity and wave shape. Positive differentiated pulses appear upon increase in the potential of the anode 15 and negative differentiated pulses appear upon a decrease in the potential of the anode 15. The differentiated pulses are characterized by a sharp rise of voltage at their leading edge and a gradually decaying trailing edge as shown at the curve (c) of Fig. 2. The intensity of the differentiated pulses is constant and determined by the intensity of the rectangular pulses of curve (b). The shape of the trailing edges of the differentiated pulses is uniform and determined solely by the time constant of the differentiating circuit 27, 28. The shape of the leading edge of the differentiated pulses is also uniform and determined by the switching time of the tubes 12 and 13. The differentiated pulses, therefore, are of uniform intensity and configuration, and occur at a repetition rate determined by the repetition rate of the rectangular voltage pulses generated in the circuit 9. So long as the repetition rate is below a predetermined value the pulses of curve (c) are also of uniform duration, as will be more fully explained hereinafter.

The integrating discharge device 10 is normally biased to cut off by connection of its control electrode 29 to the source of negative potential B— through the resistor 28. As pointed out heretofore, the cathode 31 is connected to a voltage divider 34, 35 which maintains the cathode potential slightly less negative than the potential of the source B—. Accordingly, therefore, negative differentiated pulses appearing across the resistor 28 are ineffective to control the discharge device 10. Positive differentiated pulses, however, render the discharge device 10 conductive, so that the anode 30 of the discharge device 10 conducts a pulsating current, the wave shape and intensity of which are determined by the positive differentiated pulses across the resistor 28. The pulsating anode current $I_{10}$ of the discharge device 10 is shown at the curve (d) of Fig. 2. It will be understood that the current pulses in the anode 30 are of uniform intensity and wave shape, as are the positive differentiated pulses across the resistor 28. Therefore, so long as the frequency is low enough to permit full discharge of the differentiating circuit, the pulses of curve (d) are of uniform duration and energy content. These output current pulses of fixed energy content are supplied to the integrator anode circuit including the resistor 32 and capacitor 33 in parallel. The capacitor 33 discharges between pulses, so that the average potential thereacross is determined by the average intensity of the current pulses. The average current $I_{32}$ in resistor 32 is shown at the curve (e) of Fig. 2. Since the current pulses of curve (d) are individually of uniform intensity, the average intensity, shown at curve (e), is proportional to their repetition rate and, hence, proportional to the frequency of the input signal.

The negative unidirectional potential developed across the capacitor 33 is amplified in the direct coupled amplifier 11 and appears between the anode 41 and ground across the capacitor 43 in the anode circuit of the amplifier 11. Any ripple in the unidirectional output voltage of the amplifier 11 is by-passed by the capacitors 36a and 37a. The voltage across the capacitor 43 is thus a function of the frequency of the input signal, and this voltage is applied by the lead 6 between the grid and cathode of the reactance tube 2, thereby to control the amount of the effective reactance of the reactance tube and the value of the frequency of the local oscillator 1.

It will now be evident from the curves shown at Fig. 2 that, so long as the period of a half cycle of the signal input is large compared to the discharge time of differentiating capacitor 27, the relation of the current at anode 30 to input frequency will be linear, because the differentiated pulses will be of uniform energy content. However, when the frequency of the input signal becomes so high that differentiated pulses are formed more rapidly than the preceding pulse can decay to zero, the trailing edges of the differentiated pulses will be cut off, so that the anode current approaches a maximum as the frequency increases. The frequency characteristic of the discriminator circuit, therefore, will have the general shape of that shown at Fig. 3; discriminator output as measured by the current at the anode 30 is plotted against frequency.

Figure 4:
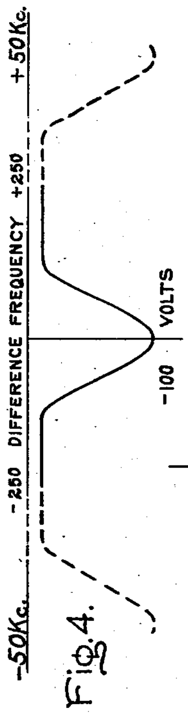

In the particular case of the automatic frequency control circuit shown herein for purpose of illustration, the input signal is a difference frequency which increases in a positive or negative sense on opposite sides of a central point of zero frequency. At Fig. 4, therefore, we have shown the discriminator output characteristic in the solid line curve as difference frequency plotted against unidirectional output voltage at the anode 41. The voltage at the anode 41 is not as linear as the output which can be obtained at the anode 30, but the difference is immaterial in the present frequency control application of our discriminator. It will be noted from Fig. 4 that, at zero input frequency, that is, when no pulses are generated in the circuit 9 so that the discharge device 10 remains non-conductive, the unidirectional potential upon the reactance tube lead 6 is a maximum and is negative with respect to ground. When potential does appear across the capacitor 33 in response to an input signal, this potential is of such a polarity that it decreases the anode current of the amplifier 11, thereby raising the potential of the anode 41 and lead 6 nearer to ground potential. The discriminator output thus varies in the same sense within a narrow differential range on either side of zero difference frequency. By way of illustration, we have shown at Fig. 4 illustrative values of difference frequency and output voltage suitable for use in connection with the automatic frequency control circuit herein described. As shown, the output voltage at zero difference frequency is approximately −100 volts and decreases to a constant minimum negative value to either side of zero frequency within a range of approximately ± 250 cycles per second.

Figure 5:
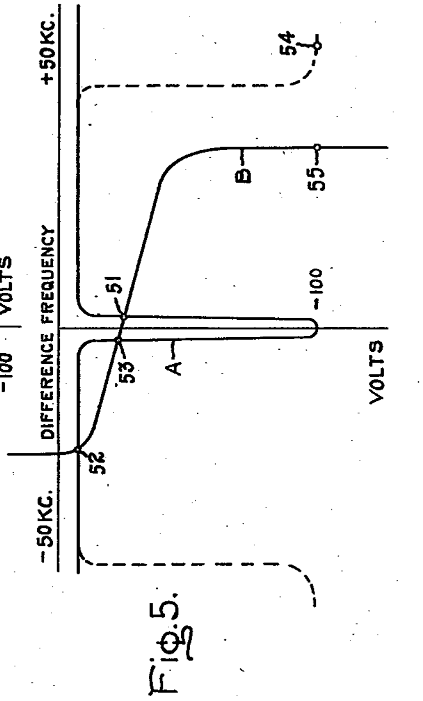

In order to illustrate more clearly the operation of the automatic frequency control circuit shown at Fig. 1, we have drawn at Fig. 5 a pair of curves showing difference frequency against output voltage. Curve A is the same curve shown at Fig. 4 on a somewhat more compressed scale and represents discriminator output voltage against input frequency. Curve B is the control characteristic of the local oscillator for a capacitive reactance tube, and is drawn as difference frequency plotted against the bias of the reactance tube 2. In curve B difference frequency is used in place of output frequency of oscillator 1, since it bears a fixed relation thereto. It will be understood that the discriminator output voltage and the reactance tube bias are the same voltage, while the oscillator difference frequency and the discriminator input frequency are likewise the same, so that these curves are plotted on the same frequency and voltage scales. Illustrative values of frequency and voltage are shown. The curve B is substantially linear within a control range of oscillator frequencies including those determining the limits of the linear differential range of curve A.

It will be noted that the curves A and B of Fig. 5 intersect at three points 51, 52 and 53. Points 51 and 52 are points of stable operation. At point 51, any change in local oscillator frequency, and hence a change in difference frequency, produces a change in discriminator voltage, and hence reactance tube bias, in such a direction as to oppose the initiating change in local oscillator frequency. At point 51, therefore, is a positive tendency to maintain the local oscillator frequency constant. At point 52, a change in local oscillator frequency, and hence in difference frequency produces no appreciable change in reactance tube bias, so that, while there is no instability at this point, there is no positive tendency to maintain the local oscillator frequency constant. At point 53, however, any change in local oscillator frequency effects such a change in reactance tube bias as to aid the initiating change in local oscillator frequency, so that the system cannot remain in this condition. It is desirable, therefore, always to have the system lock in at the stable point 51.

In order to ensure that the system will always lock in automatically at the stable point 51, when the frequency control loop is closed by the switch 6*a* or when the circuit is adjusted by tuning the local oscillator 1, the difference frequency from the mixer 4 is supplied to the discriminator circuit through the low pass filter 7. This filter is arranged to cut off abruptly at some predetermined difference frequency, for example, about ±50 kilocycles per second, greater than that determined by the limits of the control range of curve B. For difference frequencies above this value, therefore, the input signal is substantially zero, as at zero difference frequency, so that the negative discriminator output voltage is a maximum. The high frequency regions of the discriminator characteristic therefore assume the shapes shown in the broken lines in Fig. 4 and Fig. 5. If, now, the local oscillator 1 is arranged when running free to run at a frequency differing by more than 50 kilocycles per second from the crystal frequency, as at point 54 on curve A of Fig. 5, it will immediately be driven to the point 55 on its control characteristic when the feedback loop is completed. With the feedback loop closed, therefore, the local oscillator frequency is immediately controlled and constrained to move to the stable point 51 on its control characteristic at a slow rate determined by the time constant of the resistor 42 and capacitor 43.

It will be evident to those skilled in the art that the starting procedure is entirely similar when using an inductive reactance tube having a characteristic curve B of opposite slope.

It will now be apparent that without the low pass filter 7 the system would ordinarily lock in at the undesired stable point 52, so long as the local oscillator was tuned to run free at any frequency beyond the narrow discriminator range of ±250 cycles per second and the frequency control loop circuit was closed by the switch 6*a*. Beyond this range, the discriminator voltage output would always be a minimum if the filter were not included, so that as soon as the feedback loop was closed lock in would take place on the point 52. The same result would obtain in initial tuning of the oscillator with the switch 6*a* closed or omitted.

On the other hand, the low pass filter 7 is not necessary to ensure locking in of the system at the stable point 51 when the automatic frequency control loop is set in operation by the application of power in any sequence, rather than by closure of the switch 6*a* or tuning of the local oscillator 1. The circuit constants may be so adjusted that, for any sequence of power application, the discharge device 11 is supplied with anode and heater voltage at a time during the transient starting conditions when the discharge device 10 is not conducting. The device 11, therefore, has zero bias at this time and tends to conduct a large current, thereby to cause a high negative voltage to appear at the discriminator output and transiently to cut off the reactance tube 2. Thus, the discriminator output is transiently driven to the point 55 of Fig. 5, while, as the entire circuit becomes operative, the discharge device 11 is cut off and the system moves to the stable point 51 as previously described.

For example, when the negative supply voltage B— is applied first, both discharge devices 10 and 11 become operative. However, since the pulse forming network 9 requires for its operation the positive voltage supply B+ it does not supply pulses to the control electrode 29 of the discharge device 10. Device 10, therefore, remains non-conducting, and this results in a zero bias for the discharge device 11 and a consequent high negative output voltage from the discriminator. As soon as the positive voltage supply B+ is applied to the circuit, the pulse forming network 9 is rendered operative, thereby to reduce the discriminator output voltage and cause the circuit to start in a normal manner.

When the positive supply voltage B+ is applied first, the oscillator 1, mixer 4, and pulse forming circuit 9 become fully operative and supply voltage pulses to the control electrode 29 of the discharge device 10; but the anode voltage of the discharge devices 10 and 11 is supplied from the voltage divider across the B— source comprising the resistor 36 and gaseous discharge device 37. The starting characteristic of such a gaseous discharge device is such that it does not conduct current until the voltage applied to it becomes about 10 per cent greater than its nominal voltage rating. Therefore, when the negative voltage supply is turned on and its output voltage increases from zero, the greater part of the voltage will appear across the discharge device 37 and very little across the resistor 36 until the negative supply voltage exceeds the starting voltage of the discharge device 37. Therefore, there will be a transient period when the discharge device 11, whose anode supply is the voltage across the gaseous discharge device 37, has nearly full anode voltage supplied to it, while the discharge device 10, whose anode supply is the voltage across the resistor 36, has a very small anode voltage. During this transient period, the discharge device 10 operates at zero bias causing the discriminator output voltage to become highly negative. The system is therefore driven to the point 55 and starts in the normal manner.

When both the positive and negative voltage supplies B+ and B— are applied simultaneously, proper starting depends upon whether the discharge device 11 can conduct enough current to charge the capacitor 43 in the discriminator output to a negative voltage sufficiently high to cause the circuit to start before the discharge device 10 can conduct enough current to charge the capacitor 33 and cut off the discharge device 11. For proper starting, the time constant of the circuit including the discharge device 10 and capacitor 33 should be made long compared to the time constant of the circuit including the discharge device 11 and capacitor 43. A contributing factor in this respect in facilitating proper starting is the fact that the discharge device 10 can conduct only when the the pulse forming circuit 9 is operative, and that the circuit 9 will be slow in getting started after heater power is supplied, since it requires a fairly large percentage of its full gain to ensure good switching operation.

Thus, it may be seen that, when the switch *6a* is omitted, the circuit may be started in a satisfactory manner simply by the application of power in any desired sequence and independently of the operation of the low pass filter 7. The filter 7, however, is necessary in order to facilitate tuning of the local oscillator to the correct frequency. Tuning the oscillator 1 has the effect of translating the local oscillator reactance tube control characteristic B along the frequency axis of Fig. 5. Without the filter 7, the oscillator frequency will normally jump to the point 52 of this curve as soon as *6a* is closed. Now, assuming that this point initially is in the positive frequency difference region and the oscillator frequency is decreased, the lock-in point will pass through the discriminator response region so quickly that the discriminator cannot respond appreciably. Unless the operator is extremely careful or uses external frequency determining means, he will not be able to observe the discriminator response to determine the correct tuning of the oscillator. On the other hand, when the filter 7 is used, the operator need only increase the oscillator frequency until the point 52 falls in the upper cut-off region of the discriminator at which point the oscillator is driven to the point 55 on its characteristic by the large negative output of the discriminator. This point is easily observable by means of a direct current voltmeter. The operator then decreases the oscillator frequency until no part of the oscillator control characteristic falls in the cut-off region at which point the discriminator output starts to decrease and the circuit locks in correctly.

From the foregoing, it will be evident that, while there are many ways of starting the system to ensure proper locking in, it is necessary in each case temporarily to cut off the reactance tube by the imposition of a large negative discriminator output voltage. This large negative voltage drives the oscillator to the point 55 on its characteristic and, upon removal of the large negative voltage, the system will move in the proper direction along its control characteristic to the stable point 51, as previously described. It is of course necessary that the change of frequency from the point 55 to the point 51 be sufficiently slow that the discriminator will respond as the oscillator frequency approaches the point 51, thereby building up the voltage required to stabilize the system at the point 51 before the oscillator frequency has moved on through the discriminator response region. Since the discriminator is an integrating device, it requires a certain amount of time to respond and, therefore, the rate at which the oscillator may move along its control characteristic from the point 55 to the point 51 in starting must be quite slow, particularly when the frequency range to which the discriminator responds is limited, as in the illustrative example, to a few hundred cycles out of the oscillator control range of about one hundred kilocycles. When the discriminator does not build up the bias voltage required at the stable point 51 before the oscillator frequency has moved through the discriminator response region, the circuit will continue to move in the same direction, finally reaching the undesired stable point 52. To ensure a slow rate of change of the oscillator frequency in moving from the point 55 to the point 51, it is necessary that the time constant of the discriminator output circuit, including the resistor 42 and the capacitor 43, be very long.

When the circuit has locked in at the stable point 51, the difference frequency may be adjusted by means of a suitable control affecting the bias conditions of the tubes 10 or 11. For example, this may be done by adjusting the resistor 35 to vary the bias voltage on the cathode 31, thereby to vary the energy content of the anode current pulses on this tube. This changes the specific shape, but not the general form, of the output voltage-frequency characteristic of Fig. 4 so that the frequency of the stable point 51 may be varied over a wide range.

While we have described only a preferred embodiment of our invention by way of illustration, many modifications will occur to those skilled in the art and we therefore wish to have it understood that we intend in the appended claims to cover all such modifications as fall within the true spirit and scope of our invention.

What we claim as new and desire to secure by Letter Patent of the United States is:

1. A frequency control system comprising, in combination, a first source of reference frequency oscillations, a second source of oscillations subject to frequency variations, frequency converting means for combining the oscillations from said sources and developing difference frequency oscillations, means responsive to said difference frequency oscillations for generating a series of pulses of one polarity recurring at said difference frequency, each pulse having substantially the same energy content over a range of difference frequencies, means for integrating said pulses to produce a unidirectional control potential, reactance control means for said second source responsive to said potential for locking-in said second source at a stabilized frequency, and means for independently varying the energy content of said pulses to adjust said stabilized frequency.

2. In an automatic frequency control system, a first source of reference frequency oscillations, a second source of oscillations whose frequency is to be controlled with respect to said reference frequency, a mixer for combining said oscillations and selecting the difference frequency, a frequency discriminator responsive to said difference frequency and having an output stage including an anode circuit in which negative unidirectional control potentials are developed which vary with said difference frequencies over a control range, a reactance tube modulator having its output connected to control the frequency of said second source, an amplifying stage for said potentials connected between said output stage and said modulator, said amplifying stage being normally conducting, a common source of power supply for said stages and means responsive to initial application of power to said stages to energize said amplifying stage before said output stage and to delay application of said control potentials to said amplifying stage until it has become fully conducting, said means including a relatively long time constant network between said stages, thereby to insure stable starting operation of said system.

3. An automatic frequency control system comprising a source of fixed frequency electric oscillations, a second source of electric oscillations subject to variation in frequency, means for deriving from said sources electric oscillations at the difference frequency therebetween, a frequency discriminator responsive to said difference frequency oscillations and having an output voltage significantly variable with frequency within a predetermined differential frequency range on each side of zero difference frequency, said discriminator providing an output having a maximum value at zero difference frequency and decreasing toward zero as the frequency of said second source varies away from said fixed frequency in either direction over said range, frequency-determining means for said second source responsive to said discriminator output voltage, said frequency-determining means being operative to control the frequency of said second source over a first control band of frequencies including said differential range, said second source tending to have its frequency varied away from said fixed frequency in one direction as said difference frequency tends to decrease, thereby to provide a stable controlled operating frequency differing from said fixed frequency in said one direction, and low-pass filtering means in the input to said discriminator for rendering said discriminator substantially non-responsive to difference frequencies lying outside a second control band wider than and including said first control band, said filtering means having a cut-off frequency corresponding to the upper limit of said second band, whereby said output voltage has substantially the same value for difference frequencies outside said second band as at zero difference frequency.

4. An automatic frequency control system comprising a source of fixed frequency electric oscillations, a second source of electric oscillations subject to variation in frequency, means for deriving from said sources electric oscillations at the difference frequency therebetween, a frequency discriminator having an input responsive to said difference frequency, a reactance tube connected in frequency-determining relation with said second source, said reactance tube being effective to control the frequency of said second source over a first predetermined control band, said discriminator supplying a variable output control potential to said reactance tube which is maximum at zero difference frequency and which decreases as said difference frequency increases in either direction from zero over a range of frequencies within said band, said second source of oscillations having a free-running frequency which may drift so that said difference frequency lies outside said control band, and low-pass filtering means connected in said discriminator input, said filtering means having a cut-off frequency higher than frequencies in said control band and being operative to cause said potential again to increase toward said maximum for difference frequencies exceeding said cut-off frequency.

5. An automatic frequency control system comprising a source of fixed frequency electric oscillations, a second source of electric oscillations subject to variation in frequency, means for deriving from said sources electric oscillations at the difference frequency therebetween, frequency discriminating means responsive to said difference frequency oscillations and providing an output voltage having a maximum value at zero difference frequency and varying significantly with frequency to a minimum value beyond a predetermined differential range on either side of zero difference frequency, a reactance tube responsive to said output voltage and connected in frequency-determining relation with said second source, said reactance tube controlling the frequency of said second source within a first predetermined control band of frequencies including said differential range, said second source of oscillations having an uncontrolled frequency such that said difference frequency may lie outside said control band, low-pass filtering means connected in the input to said discriminating means for causing said output voltage to be substantially maximum for all difference frequencies beyond a second predetermined range of frequencies wider than and including said first band, and switching means for selectively rendering said reactance tube non-responsive to said output voltage.

6. An automatic frequency control system comprising a first source of reference frequency oscillations, a second source of oscillations subject to frequency variations, a mixer for combining the oscillations from said sources and developing their difference frequency, a frequency discriminator of the pulse-counter type responsive to said difference frequency, said discriminator producing a maximum negative control potential at zero difference frequency and a decreasing negative potential as the frequency of said second source varies either above or below said reference frequency within a first control band, a reactance modulator for said second source having a stable control point determined by a negative potential from said discriminator corresponding to a particular frequency on one side of said reference frequency, said modulator being capable of controlling the frequency of said second source over a second control band wider than said first band, means comprising a low-pass filter between said mixer and discriminator for causing said negative potential to be substantially maximum for all difference frequencies lying outside a third control band wider than and including said second band, said filter having an upper cut-off frequency corresponding substantially to the upper limit of said third band, and means for causing the uncontrolled frequency of said second source to produce a difference frequency lying above said cut-off frequency.

7. An automatic frequency control system comprising a source of fixed frequency electric oscillations, a second source of electric oscillations of controllable frequency, means for deriving from said sources electric oscillations of the difference frequency therebetween, variable frequency-determining means coupled to said second source, frequency discriminating means responsive to said difference frequency and having an output circuit, said discriminating means having an output voltage which is maximum at zero difference frequency and which decreases with variations in said controllable frequency in either direction from said fixed frequency, means comprising an electric discharge device for coupling said output circuit to said frequency determining means to control the frequency of said second source, means for supplying operating potentials to said system, and means responsive to initial application of operating potentials to said discriminating means and discharge device in any sequence for causing the output of said frequency determining means to maintain said maximum value for a period longer than that required for said discharge device to become operative, thereby to effect stable starting operation of said circuit, said last means comprising a time delay network connected in circuit between said discriminating means and said device.

HARRY R. SUMMERHAYES, Jr.
PAUL W. HOWELLS.

REFERENCES CITED

The following references are of record in the file of this patent:

UNITED STATES PATENTS

| Number | Name | Date |
|---|---|---|
| 2,207,934 | Mountjoy | July 16, 1940 |
| 2,246,688 | Kircher | June 24, 1941 |
| 2,266,401 | Reeves | Dec. 16, 1941 |
| 2,266,668 | Tubbs | Dec. 16, 1941 |
| 2,323,596 | Hansell | July 6, 1943 |
| 2,352,082 | De Rosa | June 20, 1944 |
| 2,366,076 | Wilbur | Dec. 26, 1944 |
| 2,406,125 | Ziegler et al. | Aug. 20, 1948 |
| 2,467,777 | Rajchman et al. | Apr. 19, 1949 |